United States Patent
Rich et al.

(10) Patent No.: US 8,377,603 B2
(45) Date of Patent: Feb. 19, 2013

(54) ATTACHMENT FOR A FUEL TANK OF A FUEL CELL POWERED SYSTEM AND ELECTRONIC PORTABLE DEVICE EQUIPPED THEREWITH

(75) Inventors: Dave Rich, Waterloo (CA); Chee-Ming Jimmy Wu, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 816 days.

(21) Appl. No.: 12/394,679

(22) Filed: Feb. 27, 2009

(65) Prior Publication Data

US 2010/0221628 A1 Sep. 2, 2010

(51) Int. Cl.
*H01M 8/04* (2006.01)
(52) U.S. Cl. ........................................................ 429/434
(58) Field of Classification Search .................. 429/434
See application file for complete search history.

(56) References Cited

U.S. PATENT DOCUMENTS

| | | | |
|---|---|---|---|
| 5,552,240 A * | 9/1996 | Derstine | 429/96 |
| 5,962,155 A | 10/1999 | Kuranaka et al. | |
| 7,205,057 B2 | 4/2007 | McLean | |
| 2004/0043264 A1 | 3/2004 | Guan et al. | |
| 2005/0056641 A1 | 3/2005 | Drake et al. | |
| 2006/0117659 A1 | 6/2006 | McLean | |
| 2006/0216561 A1 | 9/2006 | Chien et al. | |

FOREIGN PATENT DOCUMENTS

| | | |
|---|---|---|
| EP | 1521319 | 4/2005 |
| EP | 1793439 | 6/2007 |

OTHER PUBLICATIONS

Extended European Search Report, Jun. 5, 2009, European Patent Application No. 09154051.8.

* cited by examiner

*Primary Examiner* — Patrick Ryan
*Assistant Examiner* — Muhammad Siddiquee
(74) *Attorney, Agent, or Firm* — Bereskin & Parr LLP

(57) ABSTRACT

An attachment for a fuel tank of a fuel cell powered system is described. The attachment thermally conducts heat generated from an electronic component to the fuel tank. The attachment further affixes to the electronic component by a securing portion. In one aspect, the attachment is comprised in a fuel cell powered electronic device. In another aspect, the attachment is integral to the fuel tank.

5 Claims, 4 Drawing Sheets

ATTACHMENT FOR A FUEL TANK OF A FUEL CELL POWERED SYSTEM AND ELECTRONIC PORTABLE DEVICE EQUIPPED THEREWITH

FIELD OF THE INVENTION

This relates generally to the field of fuel cells and, more specifically, to an attachment for a fuel tank of a fuel cell powered system, and to an electronic portable device equipped with such an attachment and fuel tank.

BACKGROUND

Fuel cells have received a great deal of attention in recent years for their potential as electricity generators having a relatively low environmental impact. The basic principles of fuel cells have been understood for a long time, but they have had very little widespread use due to their comparatively high cost of production and the difficulty in managing their operation. In addition, while energy generation by a fuel cell typically produces very little in the way of chemical pollution, this benefit is often negated by the energy needed to produce and package the fuel for the fuel cell.

Different types of fuel cells also tend to have different operating parameters that can limit the effectiveness of a particular type for particular applications. For example, certain fuel cells operate at extremely high temperatures, while others require a compressed gas as a fuel source. These different requirements can create safety issues or limit the power capacity, longevity or other substantive characteristics of a fuel cell which, in turn, limits its utility for certain applications.

Despite the limitations of certain types of fuel cells, they remain a promising technology, particularly for certain power applications. The basic structure of a fuel cell is known in the art, and will not be discussed herein. However, an exemplary arrangement is shown in FIG. 1, in which a fuel cell 100 is depicted schematically as providing electrical power to an electric load 104, which is representative of an electrical system deriving power from the fuel cell 100. For electricity generation, the fuel cell must maintain a reaction that requires a source of an appropriate fuel, e.g., hydrogen ($H_2$). In FIG. 1, this source is represented as fuel tank 102, which has a fluid connection to the fuel cell 100. Depending on the type of fuel cell and fuel being used, different operating conditions must also be kept within a predetermined range. The operating temperature of the fuel cell, for example, is different from one type of fuel cell to another. In addition, the temperature of the fuel tank must be appropriate for the type of fuel being used, so as to ensure a proper flow of fuel into the fuel cell.

DETAILED DESCRIPTION

Figure 1:
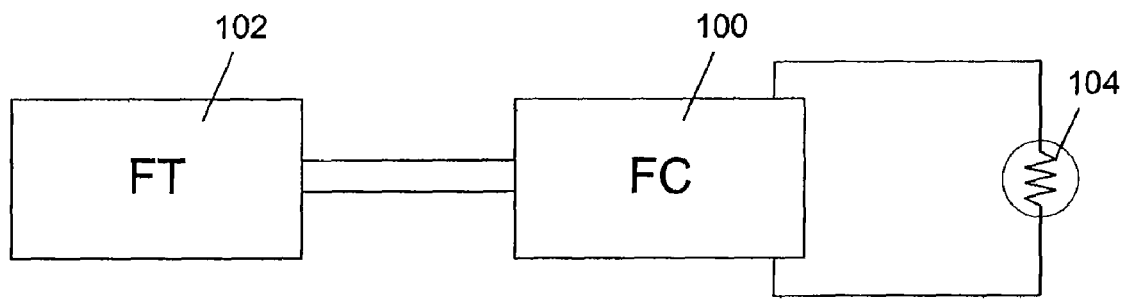
FIG. 1 is a schematic view of an arrangement of a fuel cell adapted to provide electrical power to an electrical load and a fuel tank delivering fuel to the fuel cell.

Presented in FIG. 1 is shown an electric load 104 representative of any of a number of different electrical devices and components. One example of such a load is an electrical circuit having at least one electronic component mounted on a printed circuit board (PCB) or embedded in at least one IC (integrated circuit). The electric load 104 is powered by a fuel cell 100 connected to and using fuel stored in fuel tank 102.

Figure 2:
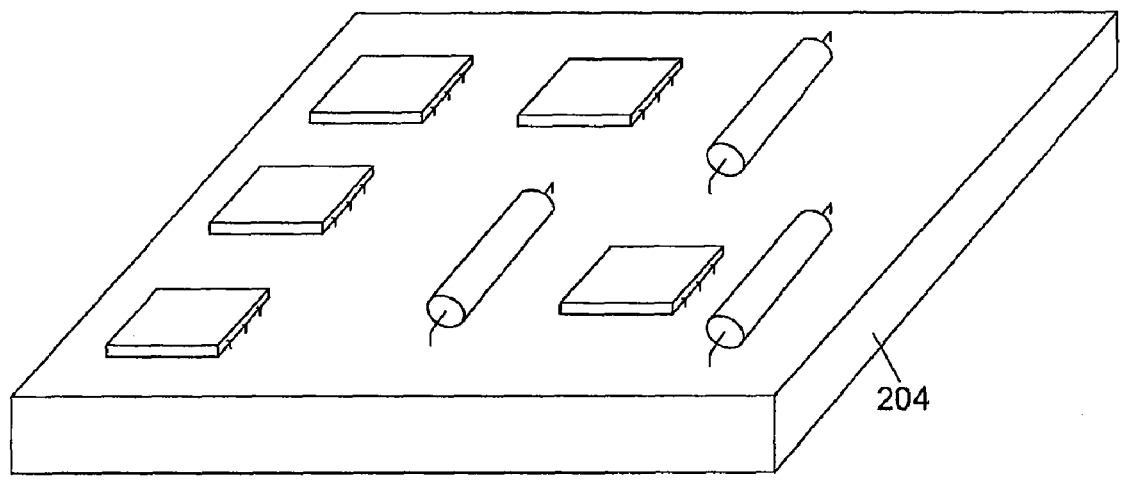
FIG. 2 is a schematic perspective view of a PCB (printed circuit board) such as those used in electronic devices.

FIG. 2 is a schematic representation of a PCB 204 including a number of discrete electronic components. Many electronic components are well known for generating a significant amount of heat that must be dissipated to the ambient environment. This may be a particular problem with small, compact devices that lack the space necessary for efficient heat dissipation.

Figure 3:
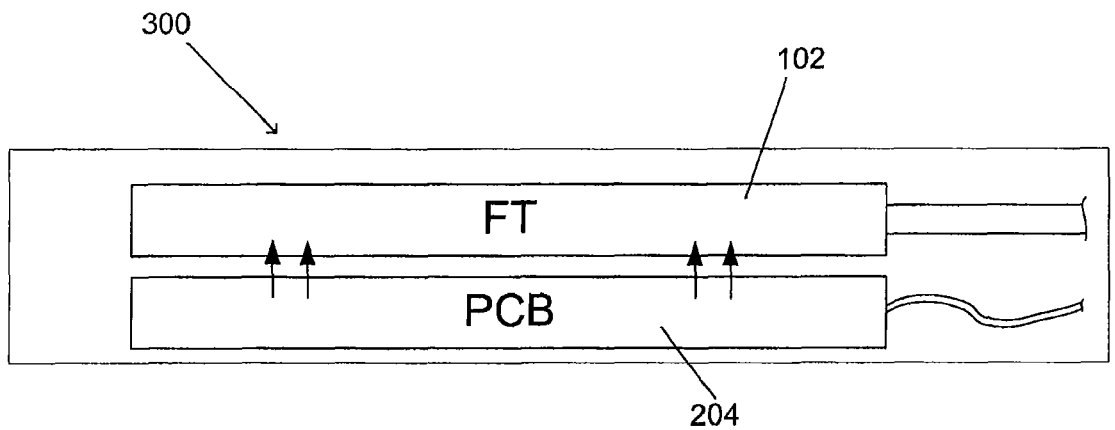
FIG. 3 is a schematic side view of a PCB within an electronic device and a fuel cell fuel tank in thermal conduction therewith.

This disadvantage may be put to good use by thermally conducting heat generated by the PCB 204 to, and used by the fuel tank 102. As shown in FIG. 3, the fuel tank 102 is located adjacent to the PCB 204, thus allowing thermal conduction there between. In certain fuel cell systems, the process of generating hydrogen from a fuel source (such as a metal hydride) is an endothermic reaction. In such fuel cells, a reaction is accomplished when heat is supplied to the fuel in the fuel tank 102. As PCBs 204 often generate heat, the thermal contact of the PCB 204 to the fuel tank 102 allows use of this heat to increase the temperature of the fuel in the fuel tank 102. For an endothermic reaction, using heat generated by adjacent components reduces, or removes completely the need for heat to be supplied from another source, while simplifying the mechanism for dissipating excess heat from the PCB 204.

Figure 4:
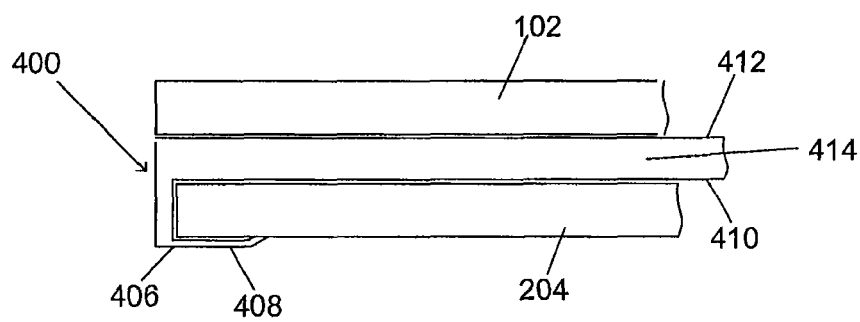
FIG. 4 is a schematic side view of a portion of a PCB with an attachment for a fuel tank, the attachment having a securing portion that is adapted to affix the attachment to an edge of the PCB.

To ensure appropriate thermal conduction between the PCB 204 and the fuel tank 102, particularly in the case of a portable device 300 which may undergo a significant amount of jostling, an attachment 400 is used between the fuel tank 102 and the PCB 204, as shown in FIG. 4. In accordance with an aspect, the attachment 400 includes a thermal conductor 414. The thermal conductor 414 has a first surface 410 for thermally contacting directly or ultimately at least one heat-generating portion of the PCB 204 and a second surface 412 for thermally contacting directly or ultimately the fuel tank 102. The thermal conductor 414 conducts heat from the first surface 410 to the second surface 412, such that heat generated by the PCB 204 is absorbed by the fuel tank 102. For affixing the first surface 410 to the PCB 204, the attachment is provided with a securing portion 406. The second surface 412 is preferably affixed to the fuel tank 102 by any suitable means, or is part of the fuel tank 102. The first and second surfaces 410 and 412 of the thermal conductor 414 can be in direct contact with respectively the at least one heat-generating portion of the PCB 204 and the fuel tank 102. Alternatively, the first and second surfaces 410 and 412 could further covered by a heat conducting material, which could serve as a protection for the thermal conductor 414.

In accordance with another aspect, the securing portion 406 may further include a lip 408 located in opposition with the first surface 410 of the attachment 400 such that an edge of the PCB 204 resides between the lip 408 and the first surface 410. Between the opposing lip 408 and the first surface 410 is a space within which an edge of the PCB 204 may be inserted for securing the attachment thereto. The space between the opposing lip 408 and the first surface 410 is sized so that the PCB 204 fits snugly between the first surface 410 and the opposing lip 408, thereby preventing relative movement between the fuel tank 102 and the PCB 204 in a direction perpendicular to the first surface 410 of the attachment 400. The size of the space and the elasticity of the opposing lip 408 may also be such that, when the edge of the PCB 204 resides in the space, a pressure fit is formed that resists movement of the PCB 204 in a direction parallel to the first surface 410. Similar opposing lips 408 may also extend from the attachment 400 at other edges of the PCB 204. For example, for the PCB 204 having a quadrilateral shape, the lip 408 may be used to secure two, three or even all four edges of the PCB 204 to thereby further restrict lateral movement of the PCB 204 relative to the fuel tank 102.

The attachment 400 may also be secured to the PCB 204 in other ways. In another aspect shown in FIG. 5A, the attachment 400 is secured to the PCB 204 at one or more anchor points along its surface. An aperture 512, defined by the PCB 204, is indicated by broken lines. The aperture 512 provides an anchor point by which the attachment 400 may be attached to the PCB 204. The attachment 400 has the securing portion 406 that projects from the first surface 410 of the attachment 400 and that lies adjacent to the PCB 204. The securing portion 406 is shaped so that an intermediate section 516 fits within the aperture 512 of the PCB 204, and the opposing lip 408 extends in a direction parallel to the first surface 410, in opposition to that surface, and contacting a side of the PCB 204 opposite to the side contacted by the first surface 410. That is, the attachment 400 holds the fuel tank 102 in thermal contact with the PCB 204 by being effectively "clipped" to the PCB 204 via the securing portion 406 that fits together with the aperture 512. The intermediate section 516 of the securing portion 406 prevents any relative lateral movement between the PCB 204 and the fuel tank 102, and the lip 408 together with the first surface 410, prevents any relative movement of the PCB 204 and fuel tank 102 in the perpendicular direction. It will be understood by a person skilled in the art that it is possible for the attachment 400 to be also affixed to any other part of the device 300 such as to any electronic component or to a casing.

The single attachment 400 may have multiple securing portions 406 and thereby attach to multiple anchor points on the PCB 204. For example, as shown in FIG. 5B, a top view of the PCB 204 indicates two apertures 512 within each of which may reside the securing portion 406 of the attachment 400. Having multiple anchor points helps to prevent any relative rotational movement of the fuel tank 102 and PCB 204, as well as translational movement in the three Cartesian directions. In this example, two integrated circuits (ICs) 522, 524 are shown mounted to the PCB 204 (other components may also be included, but are not shown in the figure for simplicity purposes). When the attachment 400 is mounted to the PCB 204 via the securing portions 406 that fit in the apertures 512, the fuel tank 102 resides in close thermal conduction with both ICs 522, 524 and thereby functions as a heat sink for both. A thermally conductive material 526 may also be located on the PCB 204 in contact with a component such as IC 522, providing extended thermal surface contact between the heat source (the IC) and the fuel tank 102. Such a material could be used to increase the effectiveness of the "heat sink" function of the fuel tank 102 by increasing the thermal conduction paths between the IC 522 and the fuel tank 102.

Figure 5A:
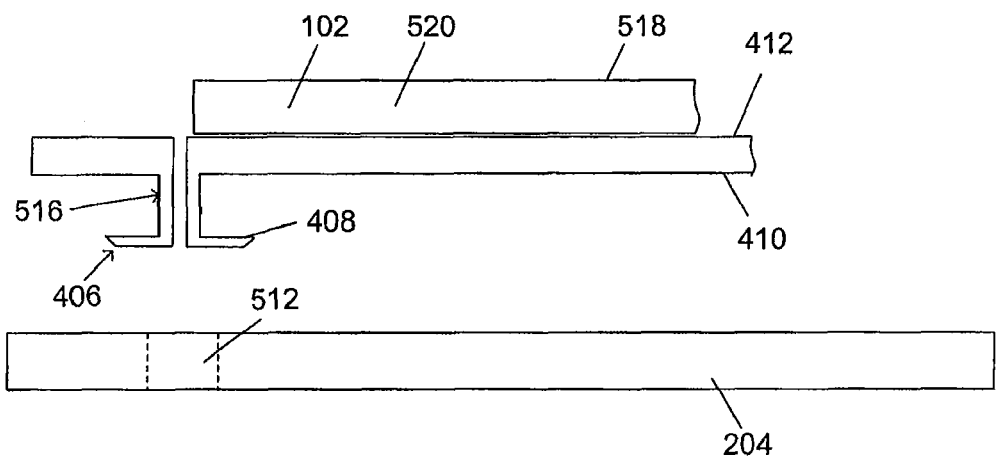
FIG. 5A is a schematic side view of a PCB for a device with an attachment for a fuel tank, the attachment having a securing portion that is adapted to affix the attachment to the PCB and reside in an aperture in the PCB.
Figure 5B:
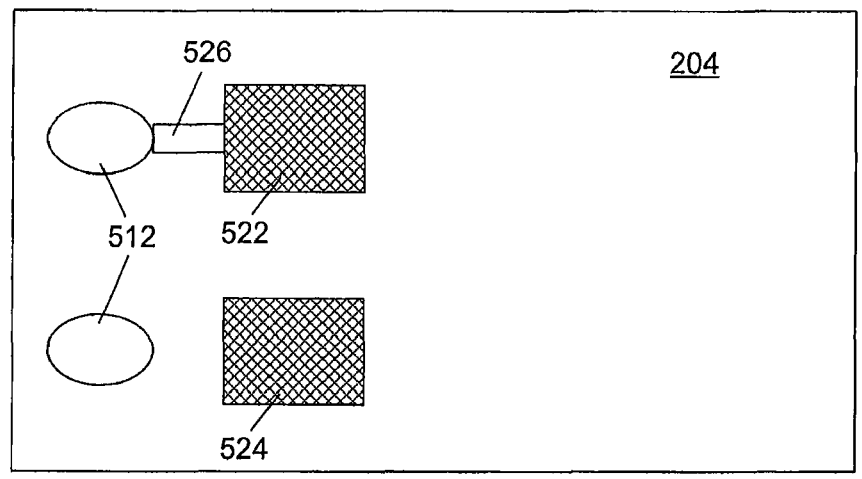
FIG. 5B is a schematic top view of a PCB like that of FIG. 5A showing several apertures defined in the PCB for affixing an attachment adapted to be in thermal contact with an electrical component of the PCB.

Back to FIG. 5A, according to another aspect, the attachment 400 is an integral part of the fuel tank's 102 structure. The first surface 410 of the attachment 400 has a flat profile and a shape that closely matches that of the PCB 204 so as to provide a high degree of heat transfer between the PCB 204 and the fuel tank 102. The first surface 410 and second surface 412 are in thermal conduction to allow the transfer of heat between the PCB 204 and the fuel tank 102. An interior space 520 of the fuel tank 102 in which the fuel is stored may further extend to the securing portion 406. This design provides additional fuel storage space, as well as additional surface area via which heat may be absorbed by the fuel tank 102. Those skilled in the art will recognize that the interior space 520 may also be limited to the flat region of the fuel tank 102.

According to yet another aspect, the attachment 400 has a shape that corresponds to the shape of the heat generating PCB 204 and physically conforms to the shape of the electronic components or ICs (522,524) of the PCB 204. As most PCBs 204 tend to be much larger in length and width than in thickness (i.e., they tend to have a flat profile), thermal conduction can be enhanced if the first surface 410 of the attachment 400 has a shape that corresponds to the shape of the PCB 204. For doing so, the first surface 410 is designed in such a way that its profile matches a surface of the PCB 204.

Figure 6A:
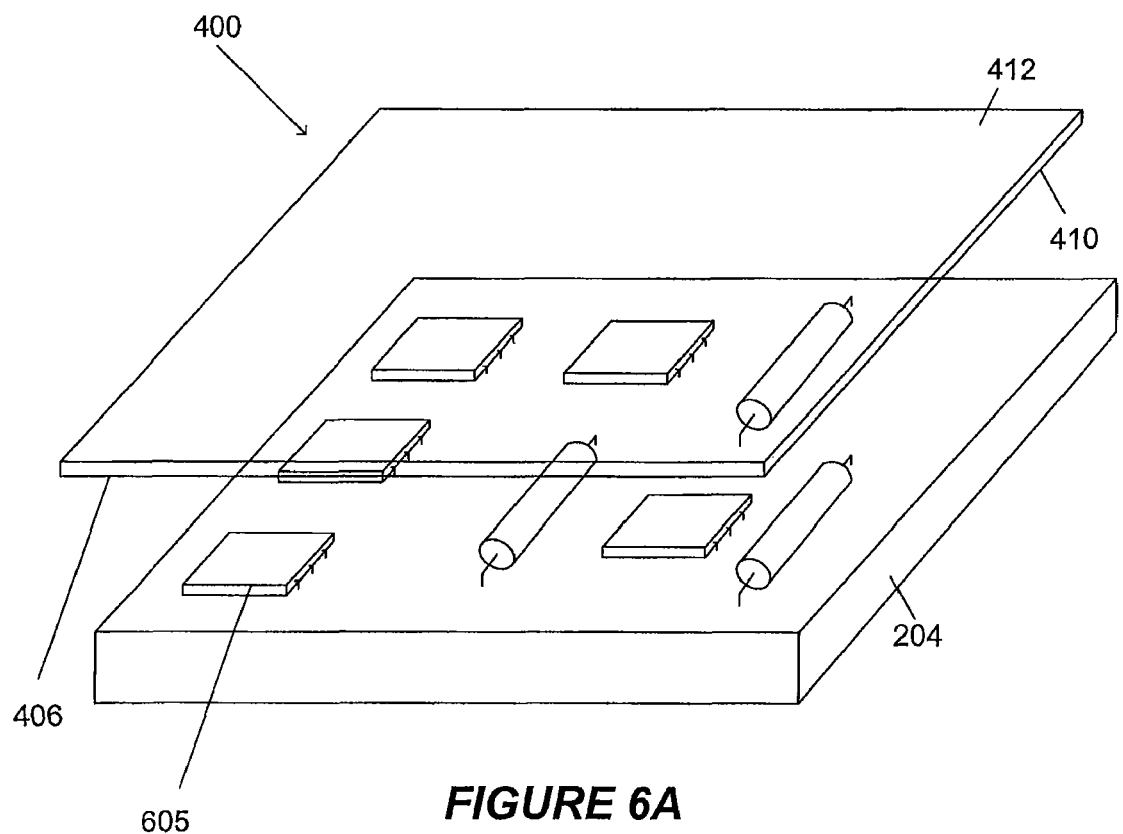
FIG. 6A is a schematic perspective view of a PCB and a first and second surface of the attachment that is integral with the PCB.
Figure 6B:
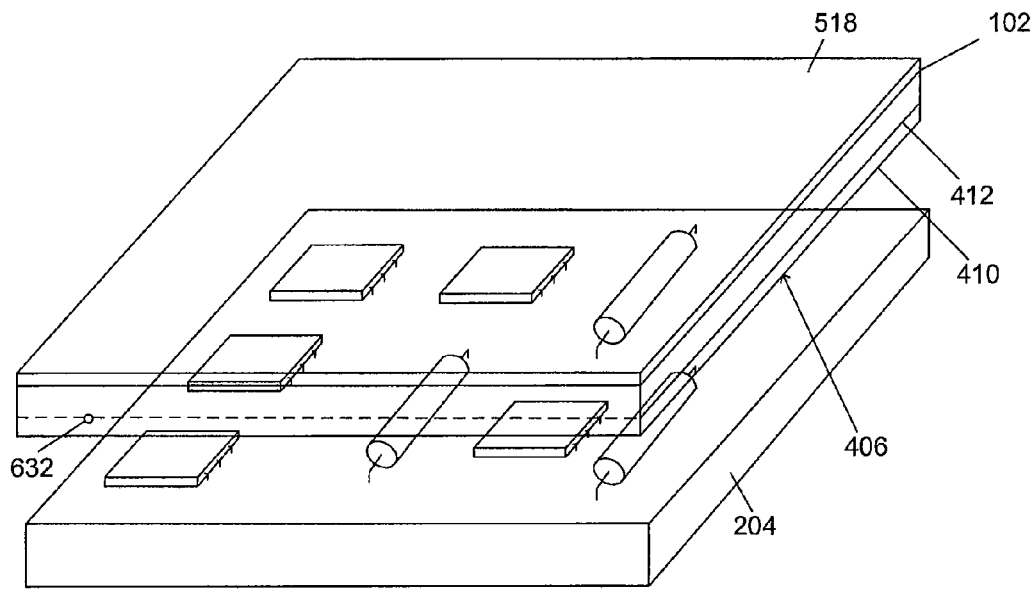
FIG. 6B is a schematic perspective view of the PCB of FIG. 6A showing a top portion of the integral fuel tank and attachment system.
Figure 6C:
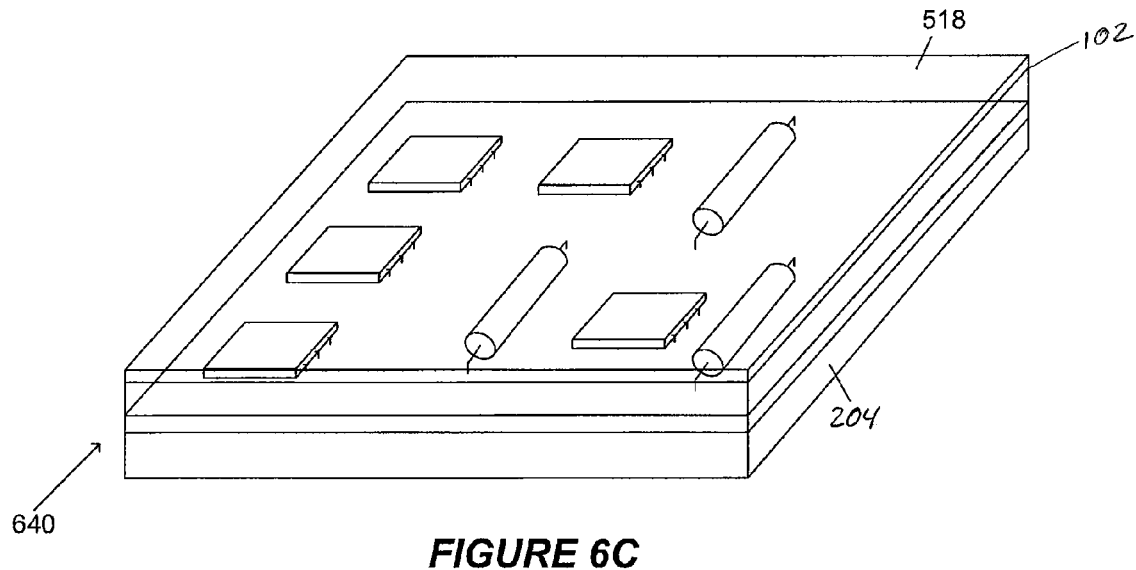
FIG. 6C is a schematic perspective view of the PCB of FIGS. 6A and 6B showing the integral fuel tank and attachment system integrally adjacent to the PCB.

Reference is now made to FIGS. 6A-6C, which depict yet another aspect. In this particular aspect, the PCB 204, the attachment 400, and the fuel tank 102 form a single integrated unit 640. The first surface 410 of the attachment 400 (shown separated from PCB 204 for clarity) is affixed with the securing portion 406 to a heat-generating portion of the PCB 204 in the orientation shown as part of an assembly process. The securing portion 406 is a fastening layer such as a seal applied on the first surface 410, however other types of affixing means are also applicable such as the securing portion 406 which is adapted to reside within the aperture 512 of the PCB 204, the lip 408 which extends in a direction parallel to the first surface 410 or any other effective affixing means. When assembled, this first surface 410 serves as a thermal PCB contacting surface. The first surface 410 may be made of one or many different materials. There are also different means by which to seal the first surface 410 to the PCB 204.

The second surface 412 of the attachment 400 is part of the fuel tank 102 to create a fully enclosed interior space 520 (with the exception of one or more filling/output ports, which are not shown in the figure). Once the integrated unit 640 is assembled, the first surface 410 and the second surface 412 isolate the PCB 204 components from the fuel on the interior space 520 of the fuel tank 102. The fuel tank 102 may be designed in any desired shape and volume providing an interior space 520 within which the fuel may be stored.

The first surface 410 may be made of heat conducting deformable material, which can be applied to the PCB 204 as a conformal coating by a variety of different techniques. A top portion 518, which functions as the top and sides of the fuel tank 102, may be made of a material with sufficient rigidity at operating temperatures that it retains the desired shape of the fuel tank 102. FIG. 6C depicts an example of such an integrated unit 640 once it has been assembled on the PCB 204.

Those skilled in the art will recognize that, while the heat-generating portion of the PCB 204 is visible through the integrated attachment and fuel tank system shown in FIGS. 6A-6C, this particularity is used for graphical representation purposes only, and that it is not necessary for the integrated unit to be made of transparent material.

A further aspect relates to an electronic portable device including a fuel cell powered system and an attachment as previously described. Heat generation in an electronic portable device is of particular concern, and use of the heat generated by electronic components to improve performances of a fuel powered system can be an asset. For doing so, the electronic portable device includes a fuel tank for storing fuel to be used by a fuel cell for electrical power generation. As previously described, the thermal conduction between the fuel tank and one or several heat generating electronic components is increased by use of the attachment. Any of the previously described aspects of the attachment can be used.

The foregoing aspects of the attachment are provided for exemplary purposes only. Those skilled in the art will recognize that various changes in form, material used and design may be made thereto without departing from the spirit and scope of the attachment, fuel tank and fuel cell powered electronic device as defined by the appended claims.

The invention claimed is:

1. An attachment for a fuel tank of a fuel cell powered system, the attachment comprising:
    a thermal conductor having a first surface for thermally contacting to at least one heat generating electronic component and a second surface for thermally contacting the fuel tank, the thermal conductor conducting heat generated by the at least one electronic component such that heat generated by the at least one electronic component is absorbed by the fuel tank;
    and a securing portion for affixing the first surface to the at least one electronic component, the securing portion comprising a lip located in opposition with the first surface such that an edge of the at least one electronic component resides between the lip and the first surface and is retained therein.

2. The attachment of claim 1 wherein the securing portion is adapted to reside within an aperture defined by the at least one electronic component.

3. The attachment of claim 1 wherein the securing portion is an integral part of the fuel tank.

4. The attachment of claim 3 wherein the first surface physically conforms to the at least one electronic component.

5. The attachment of claim 4 wherein the fuel tank is integral with the attachment and defines an interior space for storing fuel.

* * * * *